United States Patent
Doyon et al.

(10) Patent No.: US 9,084,297 B2
(45) Date of Patent: Jul. 14, 2015

(54) INDUCTION HEAT TREATMENT OF AN ANNULAR WORKPIECE

(75) Inventors: Gary A. Doyon, Gross Pointe Farms, MI (US); Frank Andrä, Lichtenwald (DE); Douglas R. Brown, Rochester Hills, MI (US); Don L. Loveless, Rochester, MI (US); Valery I. Rudnev, Rochester Hills, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 809 days.

(21) Appl. No.: 13/086,034

(22) Filed: Apr. 13, 2011

(65) Prior Publication Data
US 2011/0248023 A1 Oct. 13, 2011

Related U.S. Application Data

(60) Provisional application No. 61/323,428, filed on Apr. 13, 2010.

(51) Int. Cl.
*H05B 6/10* (2006.01)
*C21D 1/10* (2006.01)
(Continued)

(52) U.S. Cl.
CPC *H05B 6/101* (2013.01); *C21D 1/10* (2013.01); *C21D 1/667* (2013.01); *C21D 9/40* (2013.01)

(58) Field of Classification Search
CPC .......... B21D 53/12; B21D 53/10; H05B 6/10; H05B 6/38; H05B 6/06; H05B 6/04; H05B 6/36; H05B 6/065; H05B 6/42; H05B 6/41; H05B 6/101

USPC ......... 219/637, 661, 662, 671, 672, 642–650, 219/640, 632, 635, 677, 660, 602, 624, 219/656; 29/898.06–898.066
See application file for complete search history.

(56) References Cited

U.S. PATENT DOCUMENTS

| | | | | |
|---|---|---|---|---|
| 4,589,935 A | * | 5/1986 | Scott | 148/573 |
| 4,855,556 A | * | 8/1989 | Mucha et al. | 219/640 |
| 5,104,462 A | | 4/1992 | Bishop | |

(Continued)

FOREIGN PATENT DOCUMENTS

| | | |
|---|---|---|
| EP | 2088211 A1 | 8/2009 |
| GB | 735378 A | 8/1955 |

(Continued)

OTHER PUBLICATIONS

Chester A. Tudbury, Basics of Induction Heating, May 1960, pp. 1-50, 1-51 and 1-52, vol. 1, Rider, New York (5 pages total).

(Continued)

*Primary Examiner* — Dana Ross
*Assistant Examiner* — Michael Laflame, Jr.
(74) *Attorney, Agent, or Firm* — Philip O. Post

(57) ABSTRACT

Apparatus and method are provided for inductively heat treating a circular surface of annular workpieces where at least one inductor pair is used to perform a scan induction heat treatment of the circular surface. Controlled movement of the inductors and application of quenchant is provided particularly at the initial and final heat treatment locations on the circular surface to enhance metallurgical uniformity of the annular workpiece at these locations. In combination with controlled movement of the inductors, a simultaneous power-frequency control scheme can be applied to the inductors during the heat treatment process.

24 Claims, 15 Drawing Sheets

(51) Int. Cl.
*C21D 1/667* (2006.01)
*C21D 9/40* (2006.01)

(56) References Cited

U.S. PATENT DOCUMENTS

| 7,253,381 | B2 | 8/2007 | Loveless et al. | |
|---|---|---|---|---|
| 2006/0091136 | A1 | 5/2006 | Weiss et al. | |
| 2007/0056959 | A1 | 3/2007 | Zahn et al. | |
| 2008/0035633 | A1* | 2/2008 | Weiss et al. | 219/666 |
| 2008/0141535 | A1 | 6/2008 | Rollmann et al. | |
| 2008/0149622 | A1* | 6/2008 | Weiss et al. | 219/637 |
| 2008/0290087 | A1* | 11/2008 | Ben-Shmuel et al. | 219/748 |
| 2009/0065501 | A1* | 3/2009 | Dickson et al. | 219/635 |

FOREIGN PATENT DOCUMENTS

| KR | 10-2007-0108866 A | 11/2007 |
|---|---|---|
| WO | 2007/082957 A1 | 7/2007 |
| WO | 2006/087152 A2 | 8/2008 |

OTHER PUBLICATIONS

M.G. Lozinskii, Industrial Applications of Induction Heating, 1969, pp. 598-599, Pergamon Press Ltd., London (3 pages total).

S.L. Semiatin and D.E. Stutz, Induction Heat Treatment of Steel, 1986, pp. 75-77, American Society for Metals, Metals, Park, OH (5 pages total).

Valery Rudnev, Don Loveless, Raymond Cook and Micah Black, Handbook of Induction Heating, 2003, pp. 499-509, Marcel Dekker, Inc., New York NY (13 pages total).

S. Zinn and S.L. Semiatin, Elements of Induction Heating: Design, Control and Applications, 1988, pp. 193, 194, 198-200, 241-246, ASM International, Metals Park, OH (13 pages total).

A.D. Demichev, Induction Surface Hardening, Issue 2, 1979, pp. 25-27, Mashinostroenie, St. Petersburg, Russia.

* cited by examiner

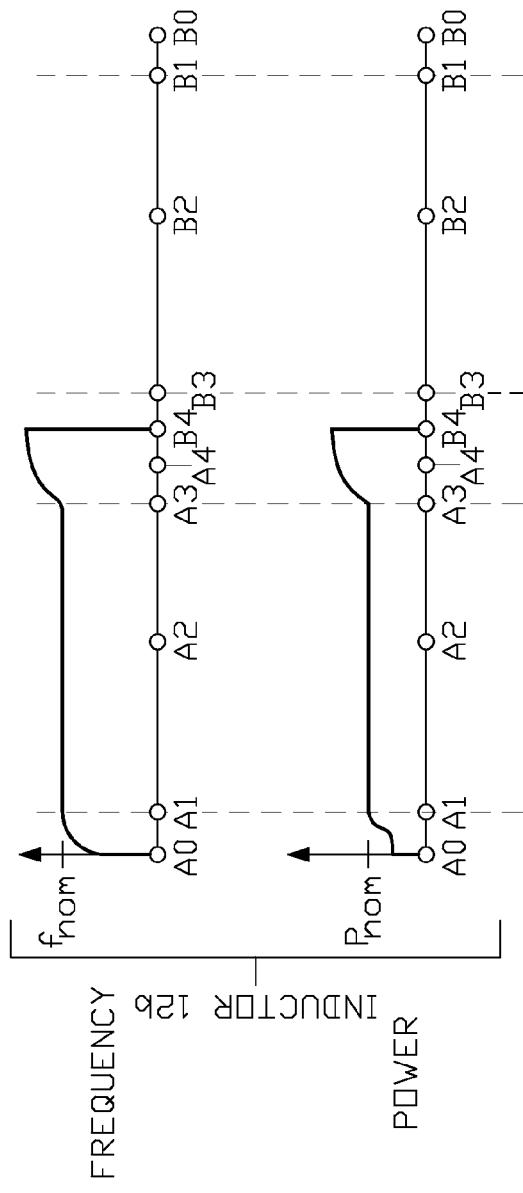

US 9,084,297 B2

INDUCTION HEAT TREATMENT OF AN ANNULAR WORKPIECE

CROSS REFERENCE TO RELATED APPLICATIONS

This application claims the benefit of U.S. Provisional Patent Application Ser. No. 61/323,428 filed Apr. 13, 2010, hereby incorporated herein by reference in its entirety.

FIELD OF THE INVENTION

The present invention generally relates to induction heat treatment of annular workpieces, and in particular to when at least one pair of inductors are utilized in a scan induction heat treatment process of one or more surfaces of an annular workpiece.

BACKGROUND OF THE INVENTION

Electric induction heating can be used to heat electrically conductive materials (for example, cast irons and steels) to temperatures in the austenitic range. The heated material is then quenched to temperatures where low transformation products, such as martensite and/or bainite are formed. There are two basic approaches to inductively heating a large annular, or ring-shaped workpiece, namely a single-shot (static) process or a scan process.

In a static induction heating process the region of the workpiece that is required to be heat treated can be surrounded by a single-turn or multi-turn induction coil. For example to metallurgically harden a region on the inside diameter 90a of annular workpiece 90 (FIG. 1(a)), an induction coil can be positioned inside of the formed annulus, and alternating current (AC) is supplied to the induction coil to establish a magnetic field around the coil that provides an electromagnetic flux coupling with the inside diameter region of the workpiece for the desired heat treatment. If heat treatment of a region (shown as shaded region 90c in FIG. 1(c)) on the outside diameter 90a' of workpiece 90, then induction coil 100 can be positioned outside of the formed annulus as shown in FIG. 1(b) and FIG. 1(c). Induction coil 100 is connected to an alternating current power source 102. In this arrangement, induction coil 100 encircles the outer diameter of workpiece 90. The workpiece can be optionally rotated (for example about workpiece central axis A) during the heat treatment process to ensure an even distribution of induced energy around the workpiece's perimeter over the entire heating cycle. Rotation rates are selected to suit process requirements.

When utilizing an encircling induction coil 100 as shown in FIG. 1(a) and FIG. 1(b), the following process parameters play a dominant role in obtaining the required hardness depth, δ, and pattern: frequency of the supplied alternating current; magnitude of the supplied induction power; quenching parameters (such as temperature of the quenchant; quenchant rate of flow (flux density); pressure and concentration of quenchant, for example with aqueous polymer quenchant); and cycle process time. Cycle process time includes: induction heating time; soaking time (if soaking is used); and quenching time. There are two commonly applied methods of quenching in a single-shot heating process of a large annular workpiece. According to one technique as illustrated in FIG. 1(d), upon completion of the induction heating stage, the heated workpiece is positioned within a separate concentric spray quench block (or ring) 104 that is positioned below the inductor 100 and spray-quenched in-place by moving workpiece 90 downwards as shown in FIG. 1(d). Upon sufficient quenching, a surface hardness layer 90c' will be formed on the surface of the workpiece. In an alternative quenching method as illustrated in FIG. 1(e), the heated annular workpiece 90 is submerged in a quench tank 92 filled with quenchant 94 and quenching takes place inside of the quench tank while the quenchant is usually agitated by suitable means.

One of the main drawbacks of a single-shot heat treatment is the necessity of supplying the induction coil (inductor) with a substantial amount of power since the simultaneous heating method requires a magnitude of power sufficient to raise the temperature of the entire surface of the ring to the required level at required depth. Therefore costly high power induction heating sources are required.

In a scan induction process, an appreciably smaller inductor than that used in the single-shot process, such as short inductor 101 moves in a circular path (concentric with the center of the workpiece) around the outer perimeter of annular workpiece 90 as shown in FIG. 2(a). Single inductor 101 is shown multiple times in FIG. 2(a) and FIG. 2(b) to indicate the directed circular travel path of the inductor, namely from start position A1, followed by sequential (clockwise CW) subsequent quadrant positions B1, C1 and D1. While moving around the workpiece the magnetic flux field established by alternating current flow in inductor 101 couples to a required penetration depth of the workpiece as diagrammatically shown by shaded regions. Single spray quench apparatus 105 moves with (tracks) inductor 101 around the workpiece and is likewise shown multiple times in the figures. Spray quench apparatus 105 may be of suitable form known in the art such as a quench block or jet, and may also be an integral assembly with the inductor. This scan induction process requires significantly less power than the single-shot process since only a small sector of the workpiece is instantaneously flux coupled and inductively heated as inductor 101 moves around the annular workpiece. A disadvantage of this method is the presence of a "soft" zone 90d in the metallurgically hardened (shaded) penetration depth 90c' as shown in FIG. 2(b) where the workpiece will not be properly heat treated. The soft zone in this example is a function of the length of the coil 101 and its scan speed and is generally in the range of 1 to 9 cm in arc length as shown in FIG. 2(b). The term "soft zone" is used to describe a region where the desired metallurgical heat treatment achieved in the penetration depth elsewhere around the outer perimeter is not achieved. Soft zone 90d is inevitably created due to the tempered region adjoining the final ring section to be heated.

To prevent soft zones while scan hardening without the requirement for an oversized power supply, as required with static one shot hardening, the prior art double inductor/quench apparatus arrangement shown in FIG. 3 can be utilized. A pair of inductors 103a and 103b can be used with each inductor in the pair performing induction hardening for one-half of the annular workpiece 90. In FIG. 3 each inductor surrounds the inner and outer perimeters of the workpiece so that penetration depths into the inner and outer perimeters are heat treated. The arrangement shown in FIG. 3 is further described in "Induction Surface Hardening" by A. D. Demichev, pages 25-26, published by the Leningrad Division of Publishing House "Mashinostryeniye", Saint Petersburg, RUSSIA, 1979. For simplicity in illustration and description FIG. 4(a) through FIG. 4(c) are provided to describe a double inductor/quench apparatus arrangement where only a penetration depth from the outer perimeter of the workpiece is heat treated. Inductors 103a (counterclockwise) and 103b (clockwise) move in circular counter directions at a constant speed around the outer perimeter of workpiece 90 from starting positions A1 and A2 respectively as shown in FIG. 4(a) through intermediate positions B1 and B2, respectively, as shown in FIG. 4(b), and then to finish positions C1 and C2, as shown respectively, in FIG. 4(c). The counterclockwise arc and clockwise arc from position A1 to position C1 and position A2 to position C2 respectively are less than 180 degrees due to the physical space taken up by both inductors when they are adjacent (side-by-side) to each other at the start and finish positions. Each inductor is supplied the same magnitude of power from a suitable alternating current source through the less than complete semicircular movement around the outer perimeter of the workpiece. As with the single inductor process described above spray quench apparatus 105a and 105b moves with (tracks) inductor 103a and 103b respectively, around the workpiece until the inductors are adjacent to each other at the end of the heating process in positions C1 and C2 as shown in FIG. 4(c). Both spray apparatus are de-energized at these positions and, simultaneously, an auxiliary spray apparatus 105c automatically provides quenchant to the final heat treated sector 90e of the workpiece as shown in FIG. 4(c). The adjacent inductors in the final heating positions C1 and C2 eliminate the presence of soft zones in the final heating positions.

One of shortcomings of the double inductor/spray apparatus process is the difficulty in providing uniform heating, and as a result, a uniform hardness depth 90c in the start and finish positions (A1, A2 and C1, C2). At the start of the heating process, the distance between inductors 103a and 103b can not be immediately adjacent to each other since the magnetic fields established by current flow in each inductor could interfere with each other if supplied by independent power supplies, which can result in lower levels of induced heating.

Additionally after the heating process starts, both inductors 103a and 103b have to travel sufficiently far from each other before quenchant can be supplied from quench apparatus 105a and 105b to heated region 90e of the workpiece 90 as shown in the detail views of FIG. 5(a) and FIG. 5(b). If quenchant is supplied too soon (that is, when the inductors have not traveled sufficiently far apart from each other), quenchant can splash onto heating sectors located under the energized inductors, which results in the formation of unacceptable hardening structures, such as an appearance of regions within the hardness pattern having inappropriate phase transformations, soft spots, and altered microstructures. Therefore, there is always a longer quench delay during the initial induction heating stage compared to the quench delay during scanning.

Both inductors 103a and 103b must travel in opposite directions sufficiently far from each other to avoid quench splashing on the zone being heated as shown in FIG. 5(c) before quench spray 105a' could begin to be supplied from quench apparatus 105a and 105b. Typically this separation distance can be in the approximate range of 5 to 10 cm. During this unavoidable quench delay time period, there will be heat loss from the previously heated region between inductors 103a and 103b due to a thermal conduction that leads to a heat flow from high temperature regions of the ring towards its cooler regions resulting from a "cold sink effect." Due to this effect, the previously heated area can cool down to temperatures below the level, and at a rate that, is too slow for obtaining a desired fully martensitic structure. During inevitable quench delay, besides the cold sink effect, cooling of the initially heated areas take place due to surface heat losses from thermal radiation and convection. Greater "hardness depth-to-ring thickness" ratios and slower scan speeds of the inductors negatively affect thermal conditions of the initially heated region that is positioned between inductor pair 103a and 103b. A similar difficulty in achieving a desired temperature distribution and hardness profile occurs in the final heating region (positions C1 and C2) of the workpiece as shown in FIG. 4(c) for reasons related to quench delay similar to those described above for the start positions of the inductors.

One object of the present invention is to achieve a metallurgically uniform hardness layer in the region where the induction heating process begins and ends in a two or more inductor/spray apparatus employing a scan heat treatment process for an annular workpiece.

BRIEF SUMMARY OF THE INVENTION

In one aspect the present invention is a method of, and apparatus for, scan induction heat treatment of an annular workpiece where at least two inductors are simultaneously used. Controlled movement of the inductors and application of quenchant is provided at the initial and final heating locations of the two inductors to enhance metallurgical uniformity of the annular workpiece at these locations. In combination with controlled movement of the inductors, a simultaneous power-frequency control scheme can be applied to the inductors.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims:

FIG. 9(a) through FIG. 9(e) graphically illustrate one example of an induced power-frequency control scheme for application with the present invention.

DETAILED DESCRIPTION OF THE INVENTION

Figure 1A:
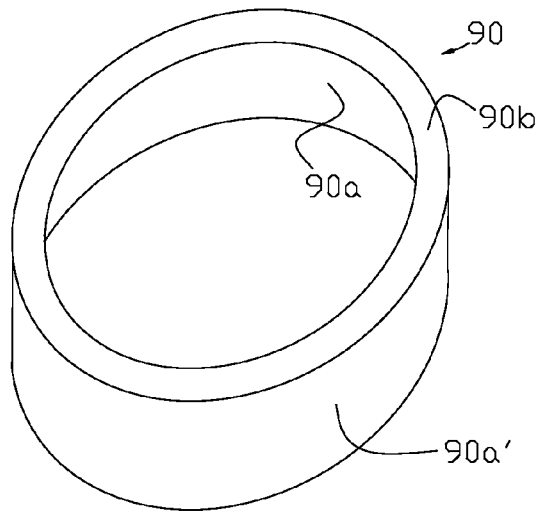
FIG. 1(a) is an isometric view of one example of an annular or ring workpiece that can be metallurgically heat treated by the method and apparatus of the present invention.
Figure 1B:
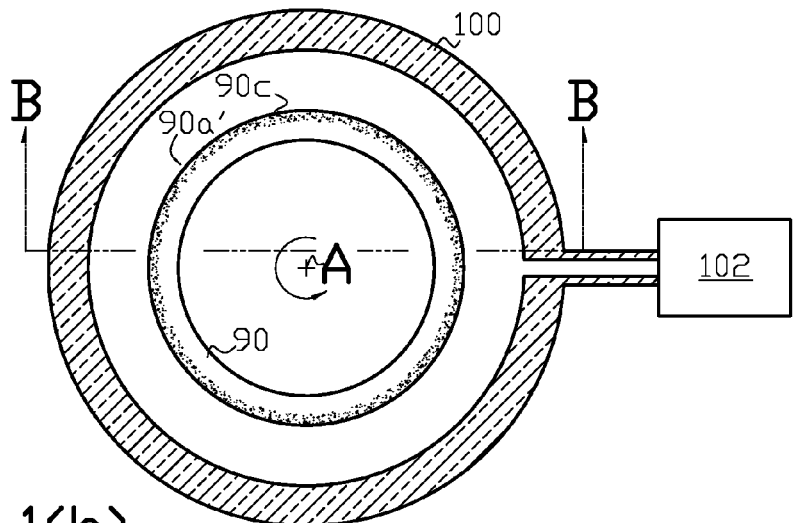
FIG. 1(b) and FIG. 1(c) are diagrammatic top view and cross sectional view (through line B-B in FIG. 1(b), respectively, of a typical prior art single-shot induction heat treatment process for an annular workpiece.
Figure 1C:
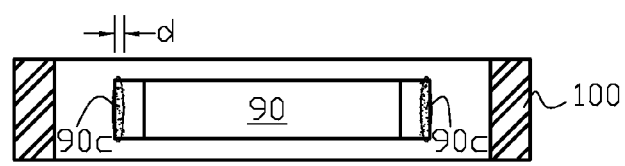
Figure 1D:
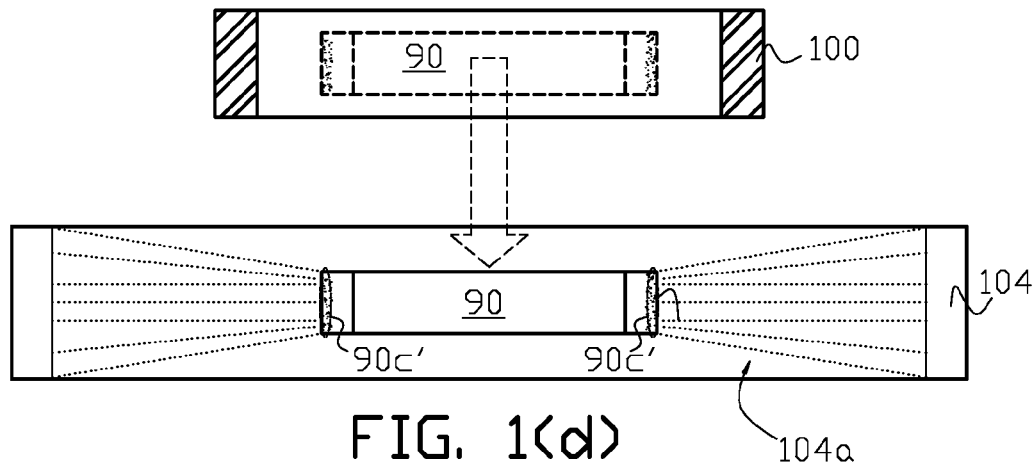
FIG. 1(d) and FIG. 1(e) illustrate two typical prior art methods of quenching the heated workpiece in FIG. 1(b) and FIG. 1(c).
Figure 1E:
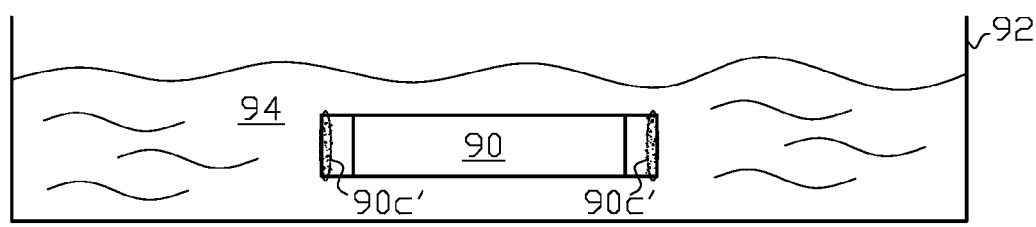
Figure 2A:
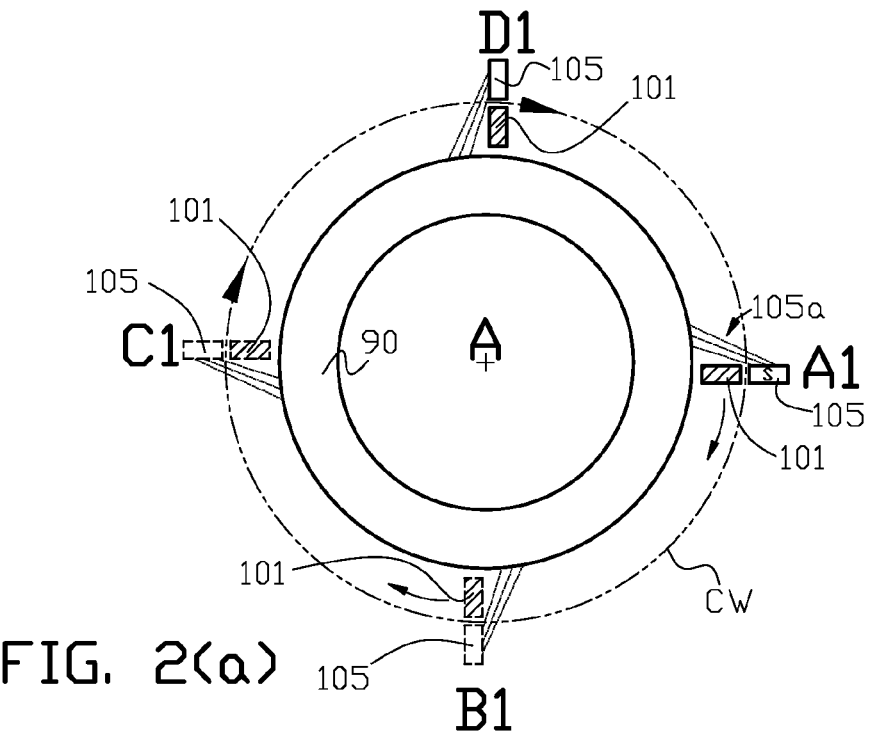
FIG. 2(a) and FIG. 2(b) diagrammatically illustrate a prior art single inductor and quench apparatus method of scan induction heating and quenching to a metallurgical hardening penetration depth around the outer perimeter of an annular workpiece.
Figure 2B:
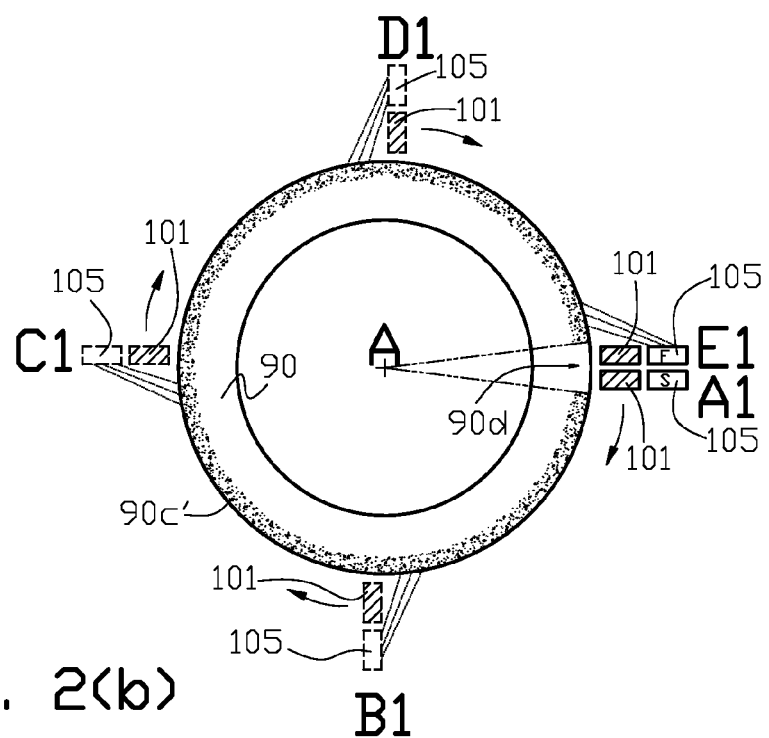
Figure 3:
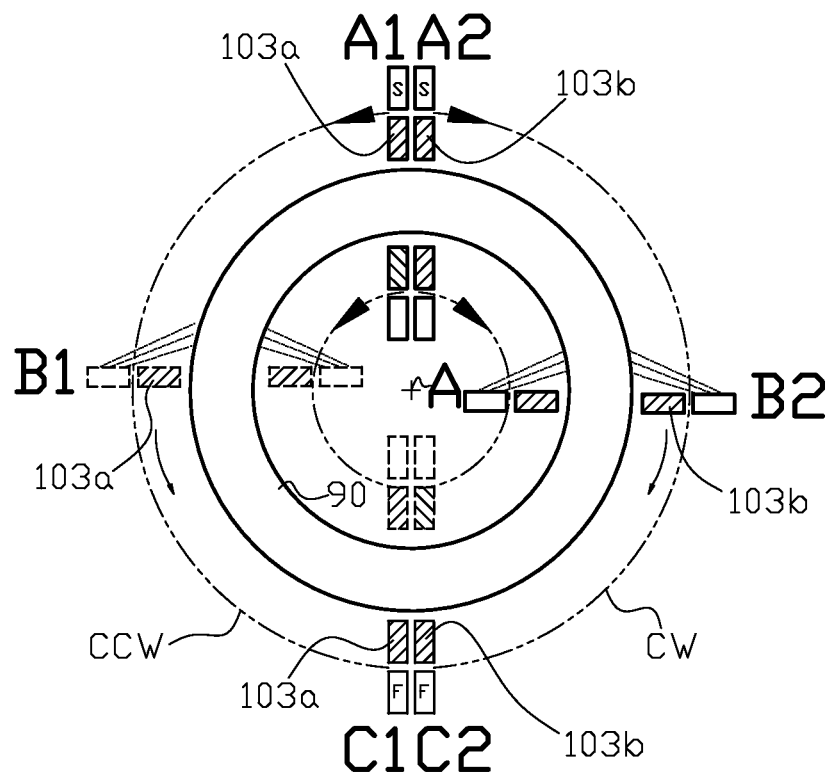
FIG. 3 is a diagrammatic top view of one prior art scan induction apparatus utilizing two inductors that metallurgically heat treat both the inside and outside perimeters of an annular workpiece.
Figure 4A:
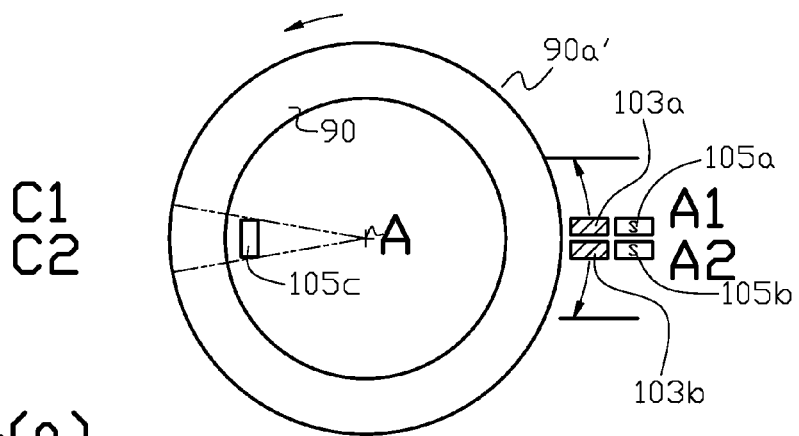
FIG. 4(a) through FIG. 4(c) diagrammatically illustrate a prior art scan induction process utilizing two inductors that metallurgically heat treat the outside perimeter of an annular workpiece.
Figure 4B:
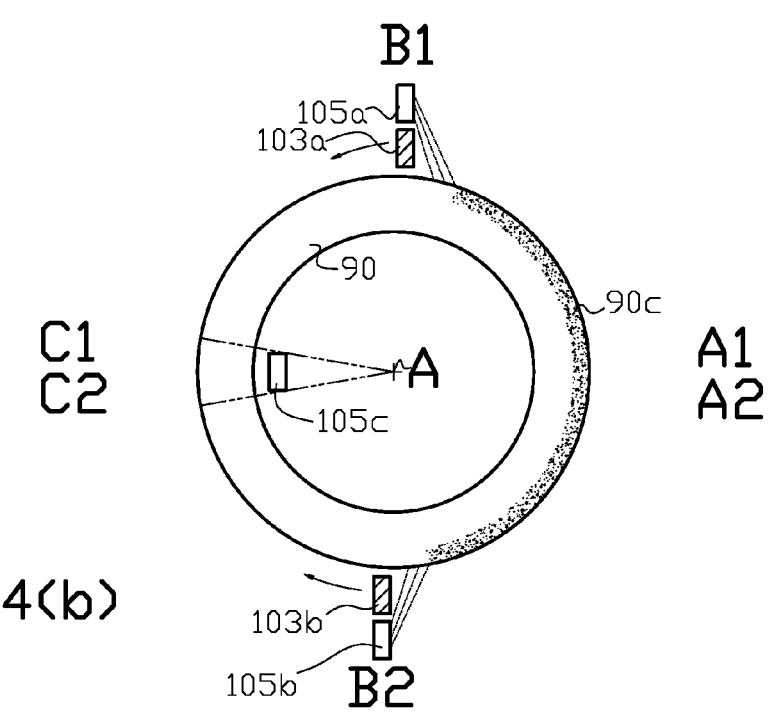
Figure 4C:
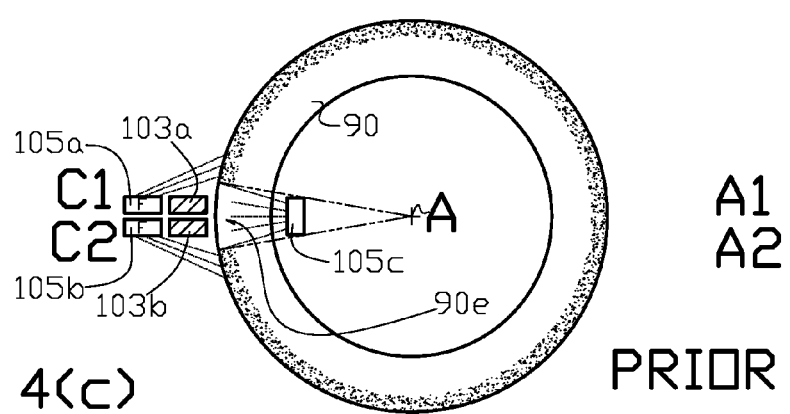
Figure 5A:
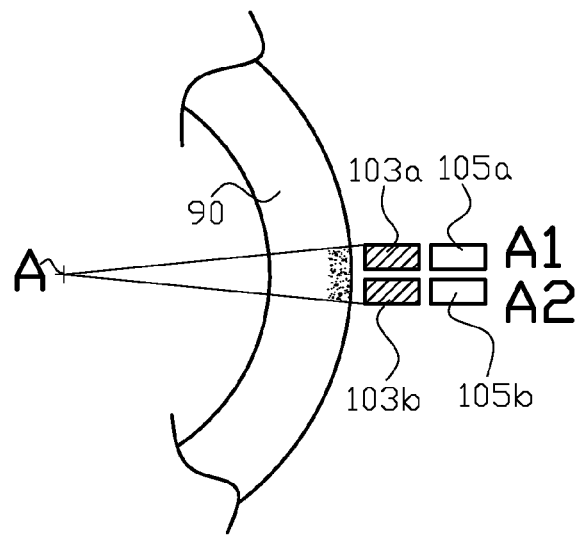
FIG. 5(a) through FIG. 5(c) diagrammatically illustrate in detail the initial heating stage process for the prior art scan induction process shown in FIG. 4(a) through FIG. 4(c).
Figure 5B:
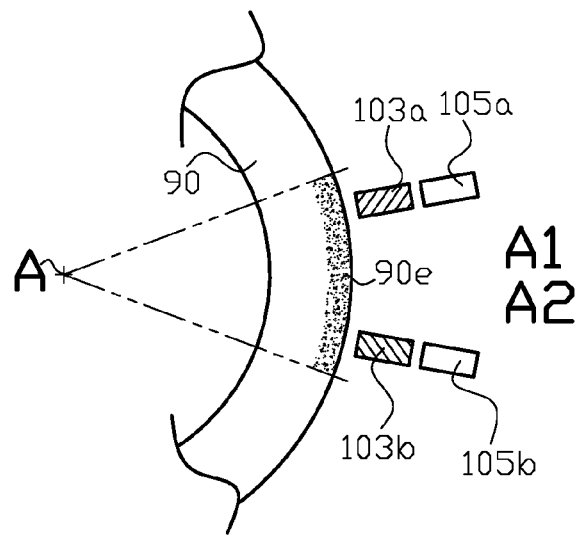
Figure 5C:
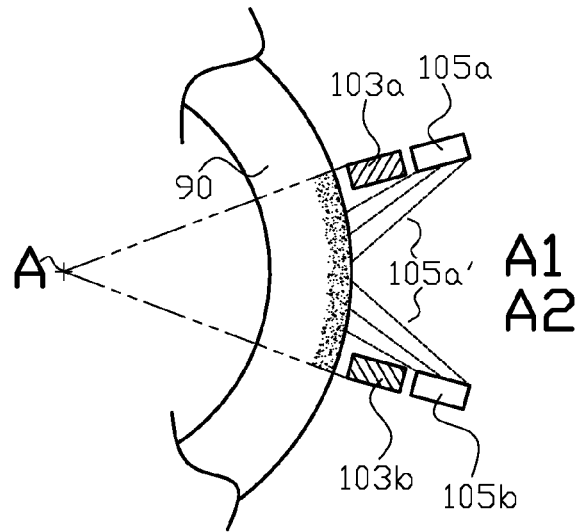

The term annular (ring) workpiece is used to describe an annular component, such as, but not limited to, a large roller or ball bearing race. Such bearing races can be used, for example, in thrust bearings in wind turbines that are capable of producing electric power in the megawatt range. If the workpiece is a large bearing race, the surface, or surfaces that may be induction heat treated are the inner and outer circular races (90a and 90a' respectively in FIG. 1(a)) and axial races (90b in FIG. 1(a); lower axial race not visible). The relative term "large" is used herein to describe an annular workpiece sufficiently large to be affected by the deficiencies described above for the prior art dual inductor scan induction heat treatment process; such an annular workpiece typically has an inside diameter of approximately one meter or larger.

An example of the induction metallurgical heat treatment process of the present invention is illustrated in FIG. 6(a) through FIG. 7(e) utilizing dual inductors 12a and 12b, with associated quench apparatus 14a and 14b, respectively. Workpiece 90 may be, by way of example and not limitation, a ring bearing race surface having an inner diameter exceeding 1 meter. Inductors 12a and 12b can typical be what is known as "hairpin" inductors since they can be formed of bent copper tubing to conform to shape of the annular workpiece's surface to be metallurgically hardened (also referred to as profiling). Magnetic flux concentrators can optionally be used to concentrate the magnetic field and improve heating efficiency. Not shown in these figures are suitable mounting structures for the inductors and quench apparatus that hold and move the inductors and quench apparatus as describe herein. Alternating (AC) current is supplied to each of the inductors from one or more suitable sources. The AC current may be controlled to vary in frequency and power over a heating process; generally the AC current to both inductors are in phase. Quench apparatus 14a and 14b are shown diagrammatically in a stacked configuration with their respective inductors 12a and 12b. Quenchant is supplied from a suitable source to the quench apparatus and quenchant outlets in the quench apparatus direct quenchant flow (spray) towards the surface of the annular workpiece that was previously inductively heated by their respective inductors in the manner further described below. Further the quench apparatus (or spray blocks) may be pivotly connected either to an inductor supporting structure or other supporting structure for controllable direction of spray impingement on a heated region of the workpiece.

Figure 6A:
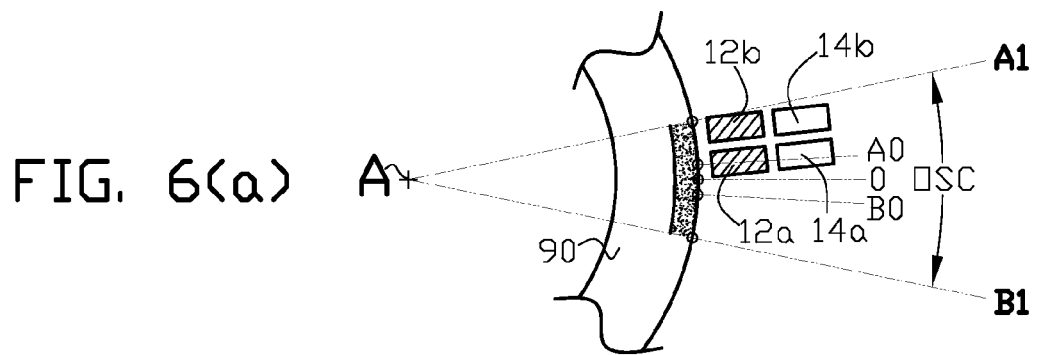
FIG. 6(a) through FIG. 6(d) diagrammatically illustrate initial heating stage process steps of the present invention for a dual inductor and quench block scan induction heat treatment process for the outside perimeter of an annular workpiece.
Figure 6B:
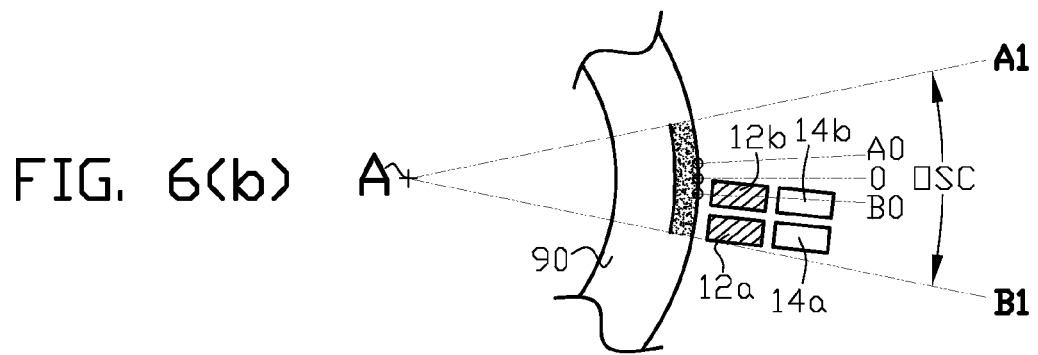

The initial step in the heat treatment process of the present invention is an oscillatory heating step within oscillation zone OSC shown in FIG. 6(a) and FIG. 6(b). In this initial step inductors 12a and 12b can be located as close together side-by-side (represented by distance $d_1$ in FIG. 6(c)) as permitted by the physical limitations of a particular design of the inductors with starting position being anywhere within oscillation zone OSC. As an order of magnitude, the side-by-side separation of the inductors is typically within the range of 1 to 5 cm, which can be a significant region of non-uniform heat treatment for large annular workpieces when installed as a component in a particular application. For convenience, when the center of zone OSC is located at designated position "0" (at three o'clock), the process starting position for the inductors may be at the upper end of zone OSC as shown in FIG. 6(a) (or alternatively the lower end of zone OSC as shown in FIG. 6(b)). The arc length of zone OSC depends upon the specific geometries of the workpiece being heat treated and the inductor design being used in a particular application; generally a non-limiting limitation on arc length will be no greater than 150 millimeters; for example, if workpiece 90 is a ring bearing race surface having an inner diameter exceeding 1 meter, this initial heating oscillation zone arc length will be approximately 100 millimeters.

With AC current supplied to the inductors, the inductors oscillate between zone OSC start position and zone OSC stop position located at the lower end of zone OSC as shown in FIG. 6(b). The initial oscillation zone heating provides a thermal barrier and reduced surface cooling effect in zone OSC and continues until workpiece temperatures in zone OSC are sufficient to form homogeneous austenite within the required hardening depth in this initial oscillatory zone OSC. No quenchant is ejected from quench apparatus 14a and 14b during this initial oscillatory heating step. Consequently if the quench apparatus are mounted and moved separately from the inductors, they may remain stationary during the oscillatory heating step as opposed to moving with the inductors as shown in FIG. 6(a) and FIG. 6(b).

Figure 6C:
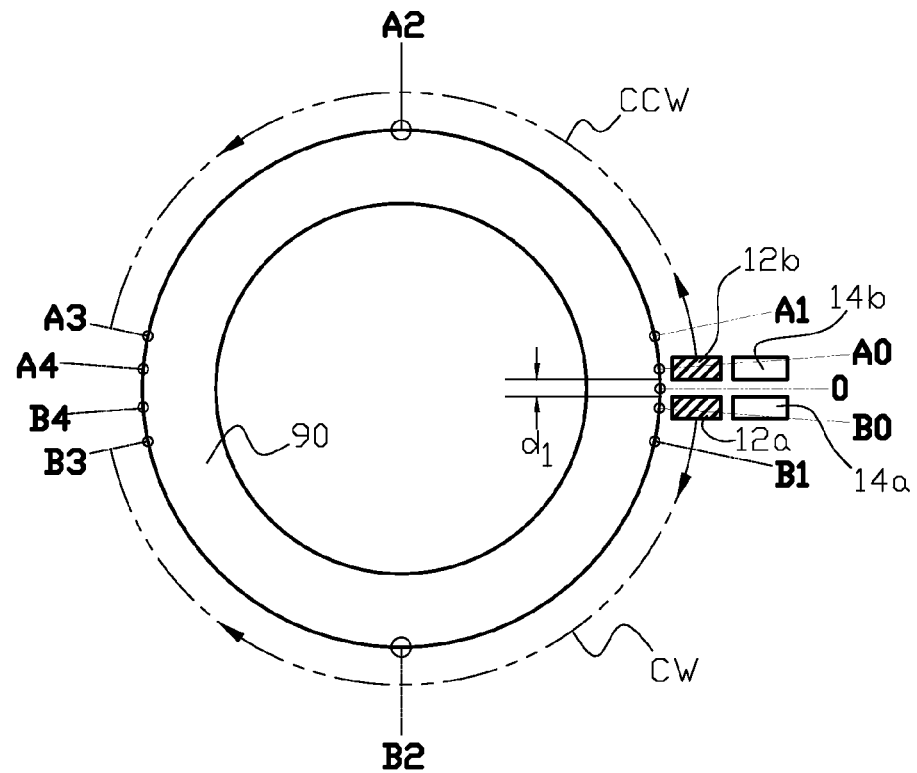

At the end of the initial oscillatory zone OSC heating, inductors 12a and 12b separate and move in opposite directions through an arc less than a complete semicircle. For this example, as illustrated in FIG. 6(c) inductor 12a (and associated quench apparatus 14a) move through a clockwise (CW) arc to heat treat surface depths through points B1, B2 and B3, while inductor 12b (associated quench apparatus 14b) move through a counterclockwise (CCW) arc to heat treat surface depths through points A1, A2 and A3 typically at a constant (steady state) scan (speed) rate.

Figure 6D:
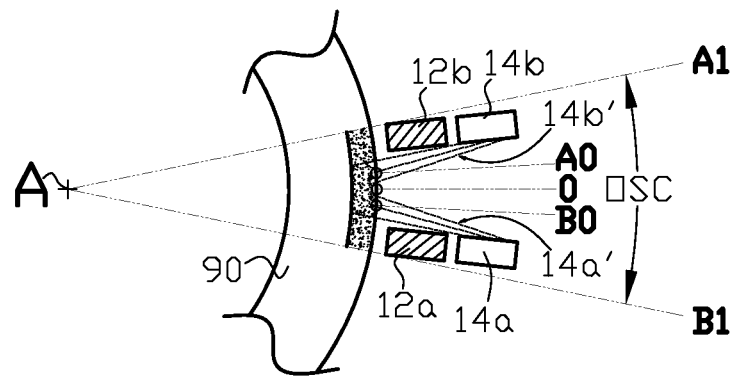
Figure 6E:
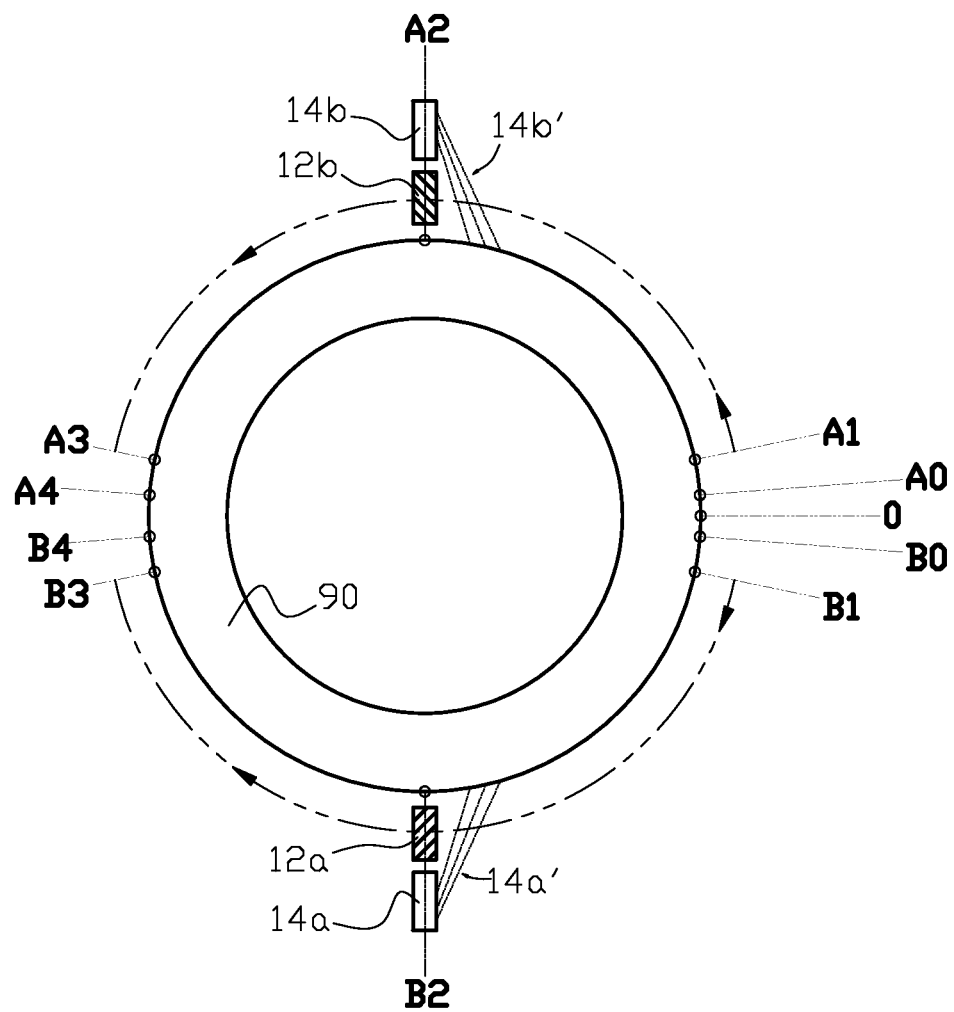
FIG. 6(e) diagrammatically illustrates one example of a steady state induction heat treatment process step between the initial heating stage and the final end of heat treatment process steps.

After inductors 12a and 12b separate a minimum distance at which quenchant spray from the non-associated spray apparatus interferes with workpiece heating of the non-associated inductor by impinging on workpiece's regions being heated by the non-associated inductor, which distance is designated as the "spray interference distance," spray apparatus 14a and 14b are activated to release quenchant onto the heated workpiece regions as diagrammatically illustrated by representative quench streams 14a' and 14b' in FIG. 6(d).

Figure 7A:
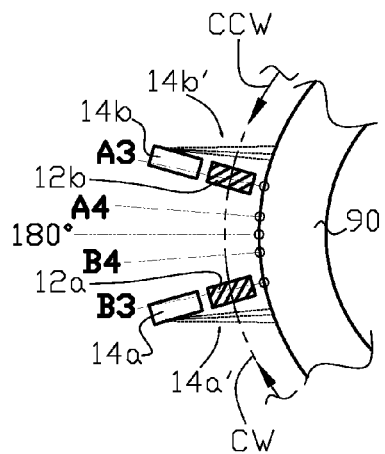
FIG. 7(a) through FIG. 7(e) diagrammatically illustrate two alternative examples of the final heating stage process steps of the present invention for a dual inductor and quench block scan induction heat treatment process for the outside perimeter of an annular workpiece.
Figure 7D:
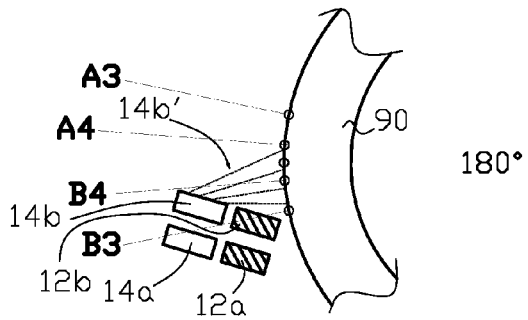
Figure 7B:
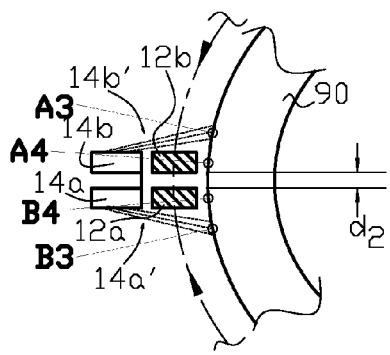
Figure 7E:
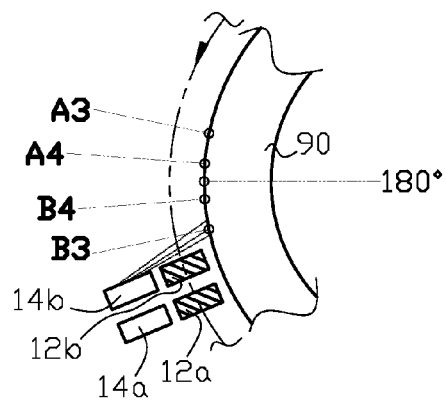
Figure 7C:
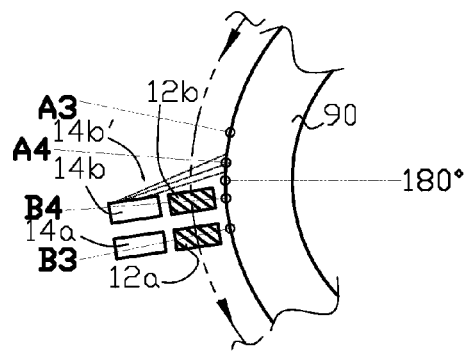
Figure 8:
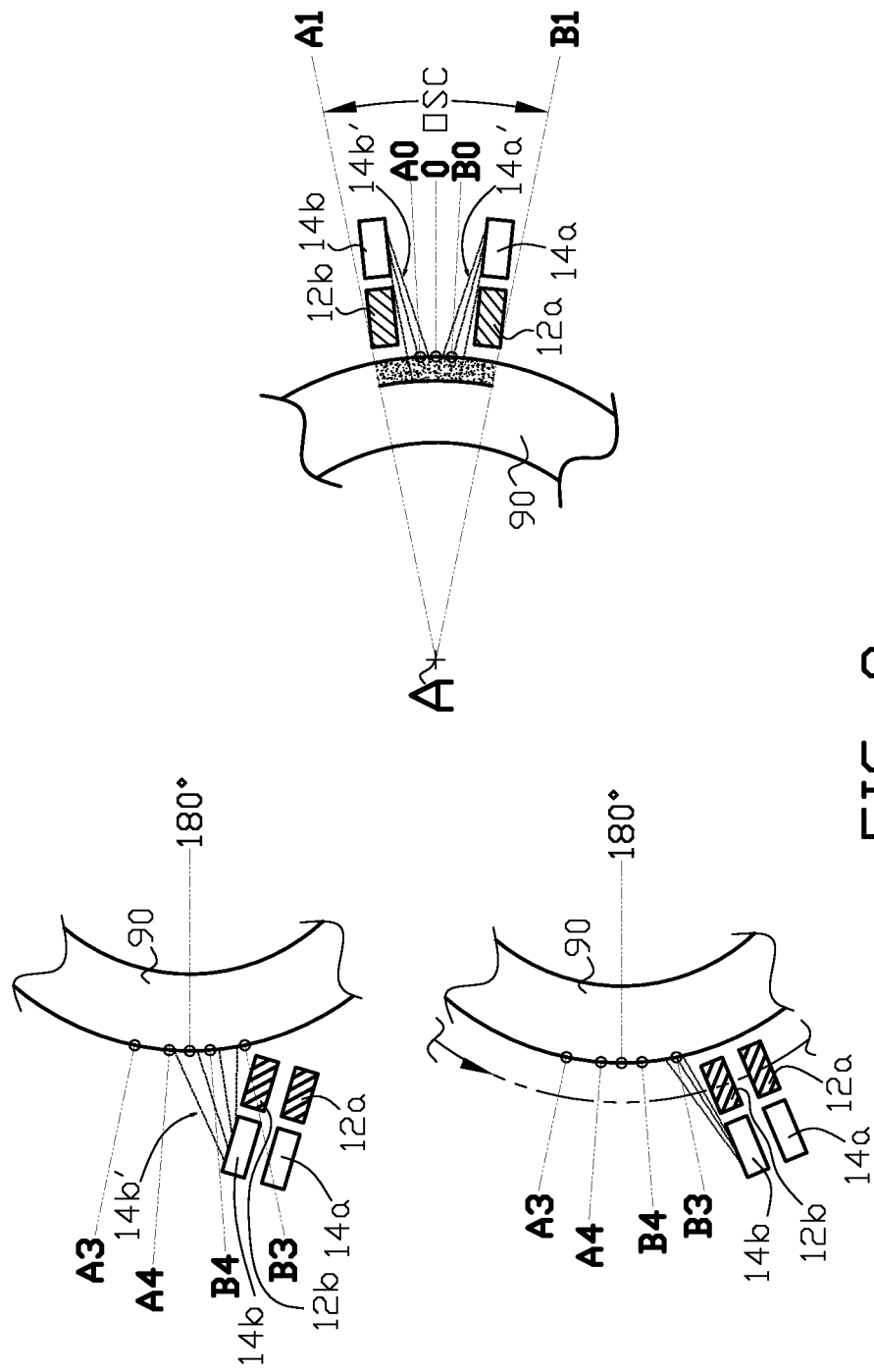
FIG. 8 diagrammatically illustrates one example of initial heating stage process steps of the present invention and two alternative examples of a final end of heat treatment process steps of the present invention.
Figure 9A:
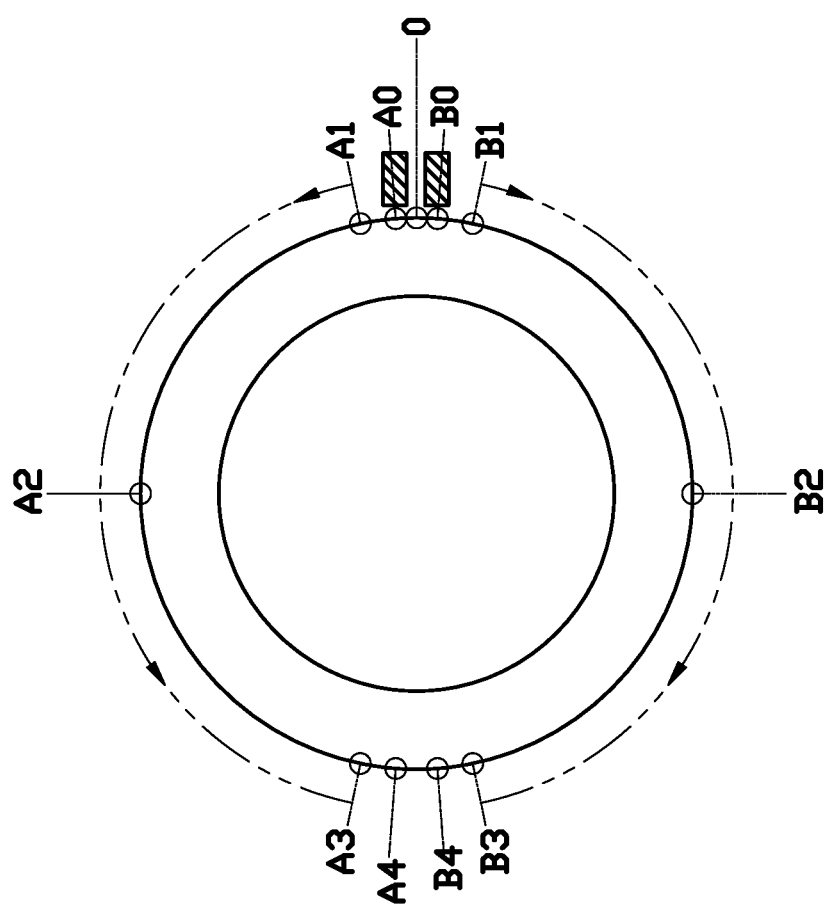

In the induction heat treatment process of the present invention, at the end of the steady state heat treatment process, inductors 12a and 12b approach each other as shown in FIG. 7(a) less than 180 degrees opposite where the heat treatment process began. Both inductors 12a and 12b continue the steady state heat treatment process until the side-by-side distance, $d_2$, between the inductors is as close as permissible based on the inductor's physical configuration (including tooling, mounting and support structure) as shown in FIG. 7(b). As one alternative final heat treatment process step, after inductor 12a completes heat treatment over and around surface region B4, as positioned in FIG. 7(b), current to inductor 12a is terminated and associated quench apparatus 14a is shut off (no spray). Inactive inductor 12a and inactive quench apparatus 14a now move in the counterclockwise direction while active inductor 12b and associated active quench apparatus 14b continue to move in the counterclockwise direction from surface region A4 to surface region B4 as shown in FIG. 7(c), preferably at: an increasing end of heat treatment scan speed greater than the steady state scan rate; an end of heat treatment power magnitude greater than the steady state power magnitude; and an end of heat treatment frequency greater than the steady state frequency as further described below relative to FIG. 9(b) through FIG. 9(e). The region between surface regions A4 and B4 that inductor 12b scans over to heat treat is referred to the "extended end scan region." Alternatively inactive inductor 12a and inactive quench apparatus 14a can be removed from the heat treatment circular tracking path to allow movement of inductor 12b and quench apparatus 14b through the extended end scan region. After inductor 12b completes its heat treatment in the extended end scan region that terminates over and around surface region B4, its associated quench apparatus 14b repositions as necessary to spray quench over and around surface regions A4-B3 as shown in FIG. 7(d), with the spray surface regions referred to as the "extended end spray region." As another alternative final heat treatment process step, after inductors 12a and 12b complete heat treatment as positioned in FIG. 7(c), current to inductor 12b is also terminated, and with quench apparatus 14a shutoff, inactive inductors 12a and 12b and active quench apparatus 14b continue to counterclockwise to the position shown in FIG. 7(e) so that quench apparatus 14b completes quench of surface region B3. Alternatively inactive inductor 12a and inactive quench apparatus 14a can be removed from the heat treatment circular tracking path to allow inactive inductor 12b and active quench apparatus 14b to continue to move counterclockwise to the position shown in FIG. 7(e). The two above alternative examples for the end of (or final) heat treatment process step can be summarized as follows for the first alternative example:

| Inductor | Surface region | Speed | Power | Frequency | Quench spray | FIG. |
|---|---|---|---|---|---|---|
| 12a | B1-B3 | SS | SS | SS | ON | |
| 12b | A1-A3 | SS | SS | SS | ON | |
| 12a | B3-B4 | SS | SS | SS | ON | 7(a)-7(b) |
| 12b | A3-A4 | SS | SS | SS | ON | 7(a)-7(b) |
| 12a | B4-B3 | Inactive | 0 | 0 | OFF | 7(b)-7(c) |
| 12b | A4-B4 | >SS | >SS | >SS | ON | 7(b)-7(c) |
| 12a | NA | Inactive | 0 | 0 | OFF | 7(c)-7(d) |
| 12b | A4-B3* | Inactive | 0 | 0 | ON | 7(c)-7(d) |

*Quench only by spray redirection.

and for the second alternative example:

| Inductor | Surface region | Scan Speed | Power | Frequency | Quench spray | FIG. |
|---|---|---|---|---|---|---|
| 12a | B1-B3 | SS | SS | SS | ON | |
| 12b | A1-A3 | SS | SS | SS | ON | |
| 12a | B3-B4 | SS | SS | SS | ON | 7(a)-7(b) |
| 12b | A3-A4 | SS | SS | SS | ON | 7(a)-7(b) |
| 12a | B4-B3 | Inactive | 0 | 0 | OFF | 7(b)-7(c) |
| 12b | A4-B4 | >SS | >SS | >SS | ON | 7(b)-7(c) |
| 12a | NA | Inactive | 0 | 0 | OFF | 7(e) |
| 12b | B4-B3** | >SS | 0 | 0 | ON | 7(e) |

**Final quench over surface regions B4-B3.

where "NA" indicates no surface heating or quench, and "SS" indicates steady state scan speed, power magnitude or frequency.

In the induction heat treatment process of the present invention as described above, a simultaneous "power-frequency" control scheme can be applied that achieves the required thermal conditions of the heat treated regions. The initial and final heating process steps described above are, preferably, but not by way of limitation, performed with simultaneous power-frequency control steps. FIG. 9(a) through FIG. 9(e) illustrate one preferred example of simultaneous variation of power and frequency at different process stages. As discussed above, during the initial step of heating, oscillation of the pair of inductors 12a and 12b takes place (FIG. 6(a) and FIG. 6(b)). Lower frequency and lower power (than nominal heat treatment frequency and power, $f_{nom}$ and $P_{nom}$) are supplied to the inductors during the pre-heat oscillation heating stage, for example, as shown in FIG. 9(b) through FIG. 9(e) during the oscillation time period when both inductors are adjacent to the surface region in the oscillation region defined by surface points "A1-A0-B0-B1" in these figures compared to a nominal steady state heat treatment stage frequency ($f_{nom}$) and power ($P_{nom}$) during the time period when the inductors separate within the oscillatory zone and travel through surface regions "A1 to A3" and "B1 to B3". Since induced eddy current penetration is inversely proportional to frequency, the initial oscillatory pre-heat stage provides required initial thermal conditions (deep surface and low level heating) of the workpiece region that will be initially heated. The initial thermal conditions can be selected to compensate for metal workpiece cooling during the initial process delay in release of quenchant as described above when the side-by-side inductors are separating from each other.

Upon completion of an oscillating stage, the inductors start traveling in opposite circumferential directions and the heat treating (heating and quenching) cycle continues according to the nominal steady state conditions as shown in FIG. 6(e) and FIG. 9(b) through FIG. 9(e) during the time period when the inductors travel separated from each other within the oscillatory zone, and travel through surface regions "A1 to A3" and "B1 to B3." During the steady state heating stage, the applied frequency and power densities of each inductor 12a and 12b are constant, and the steady state frequency and power magnitude is greater than the corresponding frequency and power magnitude in the initial oscillating stage.

In contrast to the initial heating stage, in the final heating stage, power and frequency supplied to each inductor 12a and/or 12b increases to provide sufficient thermal conditions at the end of heating by heating regions, which were not yet completely heated, according to the optional end of heat treatment process that is utilized. Preferably simultaneous variation of power and frequency at the initial and final heating stages is performed in combination with the initial and final heating stages described above. In one alternative final heating stage (FIG. 7(a), FIG. 7(b), FIG. 7(c) and FIG. 7(e)), one of the inductors is inactive (inductor 12a in the example)

and the other inductor (inductor 12b in the example) continues its movement and heating with frequency greater than steady state frequency; power magnitude greater than steady state power, and scan rate greater than steady state scan rate to maintain sufficient surface temperature for hardening areas that are quenched by quenchant from the quench apparatus as described above.

The above frequency-power control schemes may be accomplished with a computer processor controlling the output of the power supplies to the inductors and electromechanical apparatus for coordinated movement of the inductors and quench apparatus.

Movement of the inductors and quench apparatus in one of the above examples of the present invention, relative to the heating profiles in FIG. 9(a) through FIG. 9(e) is summarized in the following table.

Figure 10A:
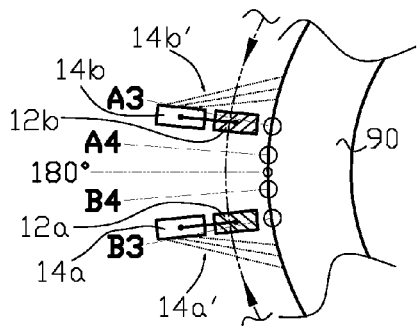
FIG. 10(a) through FIG. 10(f) diagrammatically illustrate alternative examples of the final heating stage process steps of the present invention for a dual inductor and quench block scan induction heat treatment process for the outside perimeter of an annular workpiece.
Figure 10D:
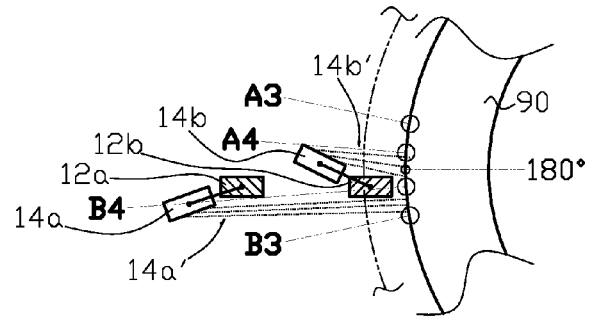
Figure 10B:
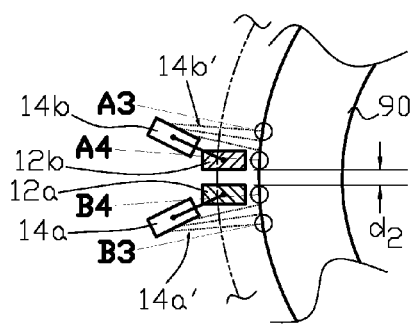
Figure 10E:
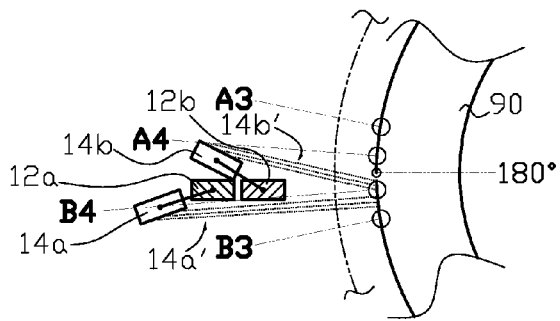
Figure 10C:
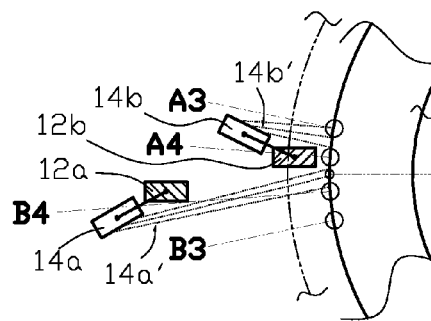
Figure 10F:
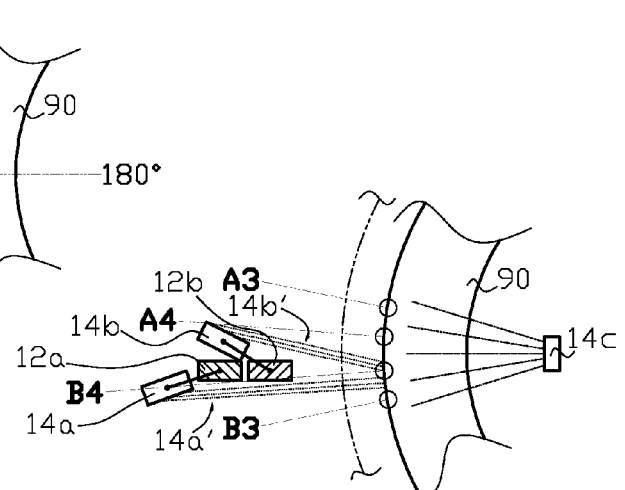

When inductor 12b completes the workpiece heating process as shown in FIG. 10(d), inductor 12b is withdrawn (removed) from the circular tracking path, which is in close proximity to the heated surface of annular workpiece 90 as shown in FIG. 10(d). Quench apparatus 14a and 14b provide quenching of the remaining heated area as shown in FIG. 10(e). At the very end of the quench cycle, quenchant spray may cease from one of the quench apparatus (for example, quench apparatus 14a) and quench block 14b finishes the quenching process as shown in FIG. 10(e). Alternatively, depending upon the geometry of the workpiece, an additional quench apparatus 14c, might be applied at the final heating position to complement quenchant flow provided by quench apparatus 14a and 14b as shown in FIG. 10(f). Additional quench apparatus 14c may be optionally utilized in any other alternative end of heat treatment process disclosed above.

| Heat treatment stage | Inductors | Quench | Frequency | Power |
|---|---|---|---|---|
| Oscillatory start zone pre-heat | Side-by-side oscillatory movement in start zone. | No quench. | Less than steady state heat treatment frequency. | Less than steady state power magnitude. |
| Steady state heat treatment from start position to beginning of end heat treatment position. | Separation in the oscillatory start zone and travel around opposing circumferential surface to the finish (end) zone when inductors are approximately side-by-side. | Quench start after distance between separating inductors exceeds spray interference distance. | Steady state heat treatment frequency. | Steady state heat treatment power magnitude. |
| Finish (end) zone heat treatment | Movement of inductors according to selected optional end of heat treatment process. | Quench control based on inactive and active inductors movement through the extended end spray region. | Generally higher than steady state heat treatment frequency based on selected optional end of heat treatment process. | Generally higher than steady state heat treatment power magnitude with optional correlation of scan speed control to refine heat treatment in finish zone. |

In an alternative end of heat treatment process, inductors 12a and 12b approach each other as shown in FIG. 10(a) less than 180 degrees opposite where the heat treatment process began. When the side-by-side distance, $d_2$, between the inductors is as close as permissible based on the inductor's physical configuration (including tooling, mounting and support structure) as shown in FIG. 10(b), one of the two inductors, for example 12a, is withdrawn from its heat treatment circular tracking path, and the remaining inductor—inductor 12b in this example—continues to move in the counterclockwise direction to the position adjacent to the circumferential surface that inductor 12a was adjacent to before it was withdrawn (FIG. 10(d) and FIG. 10(e)) to complete the end heat treatment process so that, in this alternative example, the entire circumferential region of the outer circumferential surface of the workpiece is uniformly metallurgically hardened. Both quench apparatus 14a and 14b continue to direct quenchant spray to impinge upon the region of the workpiece heated by inductor 12a in the end treatment process. Depending upon the relative mountings of the inductors and the spray apparatus, the directions of quenchant spray may be redirected by rotation of the spray apparatus as illustrated in FIG. 10(b) through 10(e) to provide a more optimum quench impingement angle.

Figure 11:
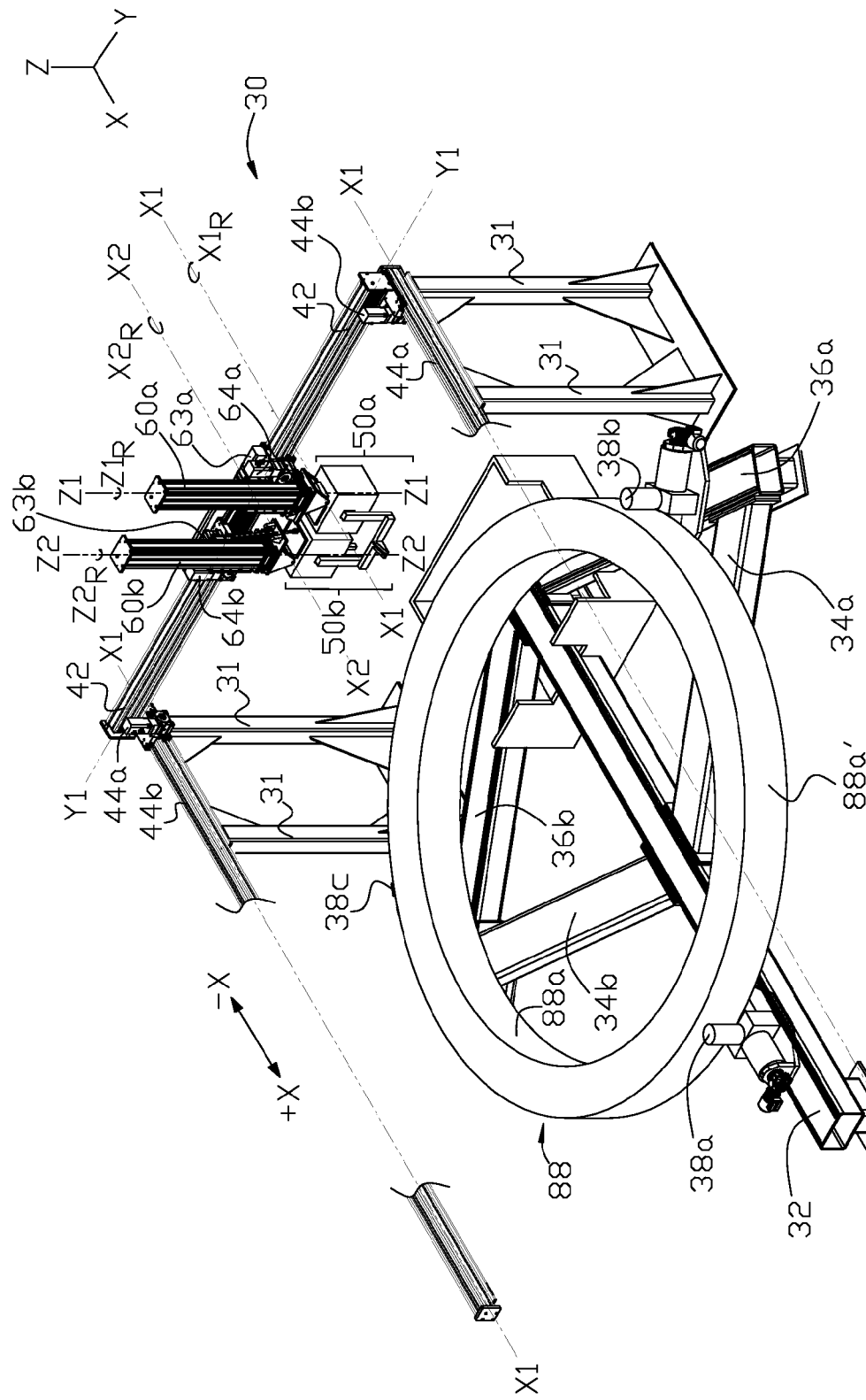
FIG. 11 illustrates one example of an apparatus of the present invention that can be used to practice some of the examples of the induction heating processes of the present invention.

FIG. 11 illustrates one example of an induction heating apparatus 30 that can be used to perform some examples of the induction heat treatment process of the present invention. For convenience, and not by way of limitation of the invention, in FIG. 11 a three-dimensional X, Y and Z orthogonal coordinate system is designated to describe relative spatial relationships between components of the apparatus in three-dimensional space. In FIG. 11, workpiece support assembly comprises central support beam 32; extended arm support beams 34a and 34b, joining arm support beams 36a and 36b, and workpiece retention elements 38a, 38b and 38c. Workpiece retention elements 38a, 38b and 38c are at least slidably mounted on central support beam 32; joining arm support beam 36a; and joining support arm beam 36b, respectively, to provide a three-point workpiece retention system. In FIG. 11, workpiece retention elements 38a, 38b and 38c are shown pressing against the outer circumferential surface 88a' of annular workpiece 88 for heat treatment of inner circumferential surface 88a (and/or upper axial surface) of the workpiece. For heat treatment of the outer circumferential surface 88a', the retention elements would be positioned to press against the inner circumferential surface 88a of the workpiece by sliding each workpiece retention element on its respective beam so that all workpiece retention elements press against the inner circumferential surface. If inner and outer circumferential surfaces are heat treated at the same time, suitable means can be provided to hold the workpiece in place without interference on either the inner and outer circumferential surfaces by the workpiece retention elements. For example the workpiece may be fixtured to a support structure that is secured by the workpiece retention elements as described above. Further seating of the workpiece in the support structure is not restricted to having the workpiece oriented parallel to an X-Y plane; the workpiece may be otherwise oriented, for example, by altering the height (Z-direction) of one or more of the workpiece retention elements. The workpiece support system of the present invention allows heat treatment of large annular workpieces with varying diameters with one apparatus 30.

In summary, if the annular workpiece 88 is a bearing race, the bearing race support assembly as shown in FIG. 11, has a pair of extended arm support beams 34a and 34b that extend at an acute angle at one of their ends from opposing sides and along the longitudinal length of the central support beam 32. The pair of joining arm support beams 36a and 36b are connected between the extended ends of the pair of extended arm support beams and opposing sides along the longitudinal length of the central support beam so that the joining arm support beam and extended arm support beams form a "V" shaped frame on each side of the longitudinal length of the central support beam. A separate workpiece retention element 38a on the central support beam and each of the two joining arm supports (retention elements 38b and 380 can slide along each of these structures so that they can engage either the outer or inner circumferential surface of the bearing race or a fixture upon which the bearing race is seated.

Inductor assembly support and movement apparatus includes Y-axis (horizontally) oriented cross rail 42 and X-axis (horizontally) oriented extension rails 44a and 44b (partially shown) located at opposing ends of cross rail 42 that can extend to at least the diameter of the largest workpiece that can be accommodated on the workpiece support assembly. The inductor assembly support and movement apparatus utilizes one or more suitable drives 44a and 44b to move cross rail 42 along extension rails 44a and 44b so that inductor assemblies 50a and 50b can move in the plus or minus X-direction over and around the workpiece.

Figure 12:
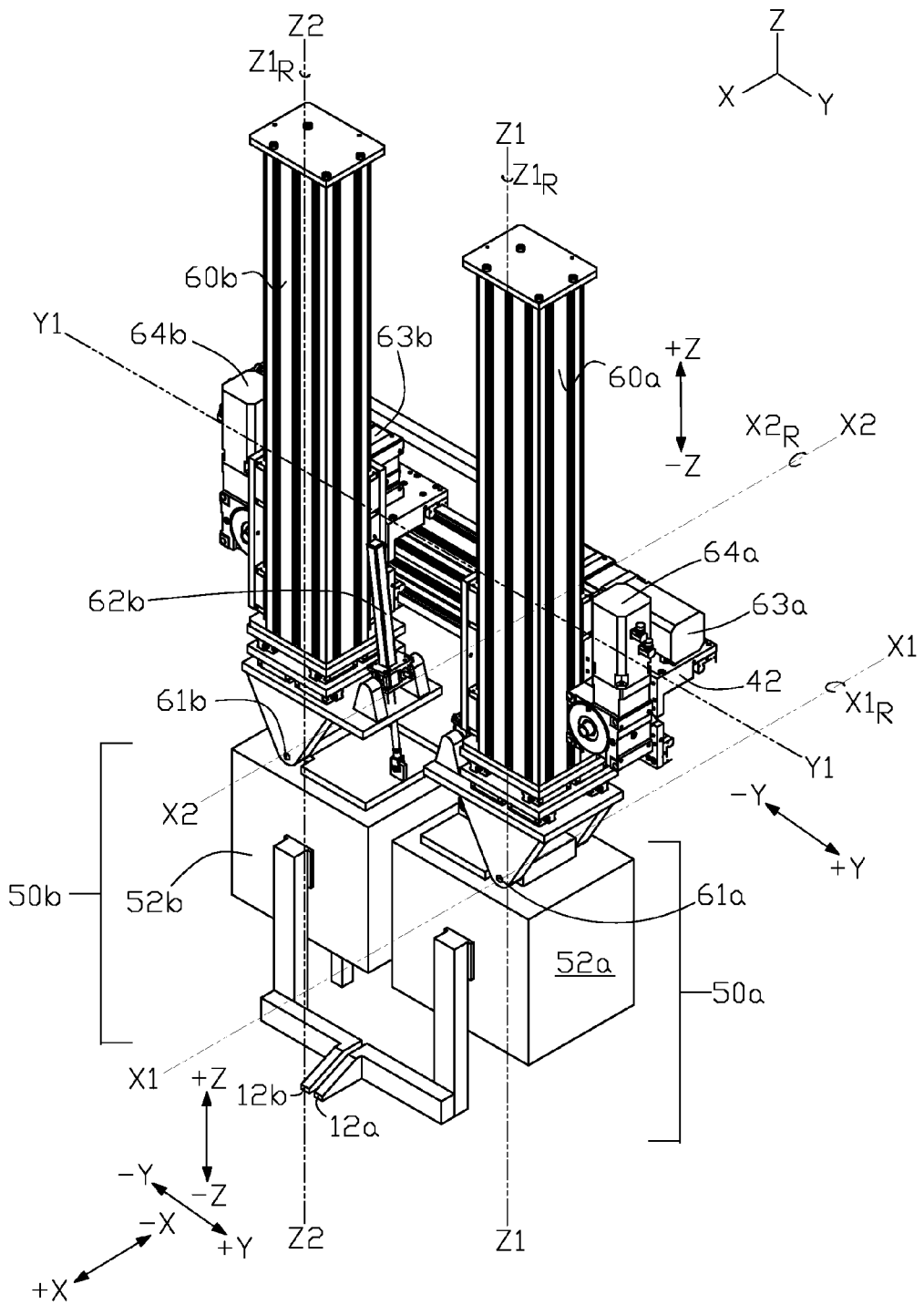
FIG. 12 is a detail view of a pair of inductor assemblies used in the apparatus shown in FIG. 11.

Referring to FIG. 12, which is a detail view of inductor assemblies 50a and 50b, first inductor 12a is connected to electrical component 52a, which may comprise a load matching transformer and/or other electrical control circuitry. Electrical component 52a is connected to a suitable alternating current power source (not shown in the figures) that can be remotely located. Electrical component 52a can be pivotally connected to vertical column support 60a by pivot element 61a that allows electrical component 52a (and connected inductor 12a) to rotate about axis X1. Vertical support column 60a can raise and lower first inductor 12a in the Z-direction by suitable driver 64a while vertical support column 60a is slidably attached to cross rail 42, which allows the vertical column (and indirectly connected first inductor 12a) to move in the plus or minus Y-direction via driver 63a. Linear actuator 62a is attached between the common support for pivot element 61a and the top of electrical component 52a with horizontal offset from the pivot point connection, which allows linear actuator 62a to rotate first inductor 12a in a Y-Z plane. A suitable driver is provided to rotate first inductor 12a in an X-Y plane.

Second inductor assembly 50b is similarly to, but independent from, first inductor assembly 50a. Second inductor 12b is connected to electrical component 52b, which may comprise a load matching transformer and/or other electrical control circuitry. Electrical component 52b is connected to a suitable alternating current power source (not shown in the figure) that can be remotely located. A common or different power source may be used for each inductor depending upon a particular application. Electrical component 52b can be pivotally connected to vertical support column 60b by pivot element 61b that allows electrical component 52b (and connected inductor 12b) to rotate about axis X2. Vertical support column 60b can raise and lower second inductor 12b in the Z-direction by suitable driver 64b while vertical support column 60b is slidably attached to cross rail 42, which allows the vertical column (and indirectly connected second inductor 12b) to move in the plus or minus Y-direction via driver 63a. Linear actuator 62b is attached between the common support for pivot element 61b and the top of electrical component 52b with horizontal offset from the pivot point connection, which allows linear actuator 62b to rotate second inductor 12b in a Y-Z plane. A suitable driver is provided to rotate second inductor 12b in an X-Y plane.

Extension of linear actuator 62b and refraction of linear actuator 62a will cause both first and second inductors to rotate clockwise off of vertical in a Y-Z plane. With the positioning system described above the first and second inductors can move with multiple degrees of freedom. With suitable programming a process controller can be used to control all of the drivers associated with the above actuators and drive mechanisms.

Quench apparatus is not shown in FIG. 11 and FIG. 12, but can be suitably affixed to the inductors tooling or support structure, or can be mounted independently and adjacent to the inductors, and can also be pivotally mounted relative to the inductors if required for a particular application.

The apparatus in FIG. 11 and FIG. 12 can be applied to one example of the heat treatment process of the present invention. For clarity heat treatment of only the outer circumferential surface of annular workpiece 88 will be described although simultaneous heat treatment of both the inner and outer circumferential surfaces can be performed. Assuming that workpiece 88 lies in an X-Y plan below the initial height (Z-direction) of inductors 12a and 12b. Drivers 44a and 44b are activated to move cross rail 42 (and inductors 12a and 12b) towards the outer circumferential surface of workpiece 88, and drivers 64a and 64b (providing a means for linearly moving each of the pair of inductors independently in a plane parallel to the central axis of the annular workpiece) are activated to lower (Z-direction) the inductors to the initial location of the heat treatment circular tracking path with side-by-side inductors adjacent to the outer circumferential surface of the workpiece. Drivers 44a and 44b and 63a and 63b are coordinately activated to produce an oscillatory X-Y directions movement (providing a means for linearly moving each of the pair of inductors in a plane perpendicular to the central axis of the bearing race in the first and second orthogonal directions of the perpendicular plane) while rotational drivers for inductors 12a and 12b are utilized to coordinately rotate inductors 12a and 12b independently about axis $Z1_R$ and $Z2_R$ to perform a pre-heat oscillatory heat treatment process step as disclosed above. After completion of the pre-heat oscillatory step, drivers 44a and 44b and 63a and 63b are coordinately activated, while rotational drivers for inductors 12a and 12b are utilized to coordinately rotate inductors 12a and 12b independently about axis $Z1_R$ and $Z2_R$ to move inductors 12a and 12b in opposite directions around the outer circumferential surface of the workpiece in a steady state heat treatment process step as disclosed above until inductors 12a and 12b reach the final (end of heat treatment) heating zone.

After completion of the steady state heat treatment process step, drivers 44a and 44b and 63a and 63b are coordinately activated, while rotational drivers for inductors 12a and 12b are utilized to coordinately rotate inductors 12a and 12b independently about axis $Z1_R$ and $Z2_R$ to move inductors 12a and 12b as disclosed in one of the end heat treatment process steps as disclosed above. In this example of the invention spray apparatus 14a and 14b, which are respectively associated with inductors 12a and 12b are mounted and moved coordinately with their associated inductors during execution of the pre-heat oscillatory step; the steady state heat treatment process step and the end heat treatment process step.

The apparatus shown in FIG. 11 and FIG. 12 may also be utilized for gear teeth hardening, and is particularly advantageous for hardening of gears with spiral teeth. In existing applications the gear must be rotated to accommodate a fixed inductor whereas in the apparatus shown the gear can remain stationary, and the same arrangement can also be used for gears with straight gear teeth.

While the term "circular" is used in the examples, the term as used herein also includes elliptically shaped workpieces. Although the above examples of the invention utilize a single pair of inductors, any number of inductor pairs could be used according to the process described above to increase production rates, with the appropriate decrease in the approximately 180 degrees arc of a complete circular surface heat treated by each pair of inductors. For example, if two inductor pairs are utilized, then each pair would heat treat an approximately 90 degrees arc of the complete circular surface. Although the above examples of the invention illustrate the process for outer (circumferential or peripheral) diameter heat treatment of the annular workpiece, the process can also be applied to inner diameter heat treatment of the annular workpiece, as well as the width (side or axial surfaces) of the annulus. Depending upon the application, heating can be applied to the outer or inner diameters of the ring or both. In other applications, the side surface of the ring alone, or in addition to outer and/or inner diameters of the ring may be heat treated by the process of the present invention.

The present invention has been described in terms of preferred examples and embodiments. Equivalents, alternatives and modifications, aside from those expressly stated, are possible and within the scope of the invention.

The invention claimed is:

1. A method of electric induction heat treatment of at least one circular surface of an annular workpiece, the method comprising the steps of:
    positioning side-by-side a first and a second inductor at an initial position adjacent to the at least one circular surface, the initial position located within an oscillatory arc zone of the at least one circular surface, the oscillatory arc zone having a first and a second arc boundary;
    supplying an oscillatory zone alternating current to the first and second inductors while circumferentially moving side-by-side the first and second inductors repeatedly between the first and second arc boundaries for a pre-heat period of time while adjacent to the at least one circular surface;
    supplying a steady state heat treatment power having a steady state power magnitude and frequency to the first and second inductors while separating the first and the second inductors in the oscillatory arc zone by moving the first inductor in a first circumferential direction adjacent to the at least one circular surface to a first inductor end steady state heat treatment position less than 180 degrees opposite the initial position at a steady state scan rate, and by moving the second inductor in a second circumferential direction adjacent to the at least one circular surface to a second inductor end steady state heat treatment position at the steady state scan rate, the second circumferential direction opposite to the first circumferential direction;
    directing a first quenchant spray from a first quench apparatus to impinge on a first inductor heated region of the at least one circular surface heated by the first inductor as the first inductor moves in the first circumferential direction to the first inductor end steady state heat treatment position after the first inductor separates from the second inductor by a spray interference distance, and directing a second quenchant spray from a second quench apparatus to impinge on a second inductor heated region of the at least one circular surface heated by the second inductor as the second inductor moves in the second circumferential direction to the second inductor end steady state heat treatment position after the second inductor separates from the first inductor by the spray interference distance;
    removing the steady state heat treatment power from the first inductor and terminating the first quenchant spray after the first inductor completes heat treatment at the first inductor end steady state heat treatment position;
    moving the second inductor in the second circumferential direction after the second inductor completes heat treatment at the second inductor end steady state heat treatment position to the end of an extended end scan region to heat treat the extended end scan region at an end of heat treatment scan rate faster than the steady state scan rate and at an end of heat treatment power magnitude and frequency; and
    directing the second quenchant spray to impinge on the extended end spray region by alternatively repositioning the second quench apparatus while the second inductor is at the end of the extended end scan region or moving the second quench apparatus through the extend end spray region.

2. The method of claim 1 wherein the step of supplying the oscillatory zone alternating current to the first and second inductors is initiated when the first and second inductors are located side-by-side at the first or second arc boundary.

3. The method of claim 1 wherein the separation of the first and second inductors in the oscillatory arc zone is initiated in the center of the oscillatory arc zone.

4. The method of claim 1 wherein the end of heat treatment frequency is greater than the steady state frequency, and the end of heat treatment power magnitude is greater than the steady state power magnitude.

5. The method of claim 1 wherein the step of supplying the oscillatory zone alternating current further comprises supplying the oscillatory zone alternating current at a pre-heat frequency less than the steady state frequency, and at a pre-heat power magnitude less than the steady state power magnitude.

6. The method of claim 5 wherein the end of heat treatment frequency is greater than the steady state frequency, and the end of heat treatment power magnitude is greater than the steady state power magnitude.

7. A method of electric induction heat treatment of at least one circular surface of an annular workpiece, the method comprising the steps of:
    positioning side-by-side a first and a second inductor at an initial position adjacent to the at least one circular surface, the initial position located within an oscillatory arc zone of the at least one circular surface, the oscillatory arc zone having a first and a second arc boundary;

supplying an oscillatory zone alternating current to the first and second inductors while circumferentially moving side-by-side the first and second inductors repeatedly between the first and second arc boundaries for a pre-heat period of time while adjacent to the at least one circular surface;

supplying a steady state heat treatment power having a steady state magnitude and frequency to the first and second inductors while separating the first and the second inductors in the oscillatory arc zone by moving the first inductor in a first circumferential direction adjacent to the at least one circular surface to a first inductor end of steady state heat treatment position less than 180 degrees opposite the initial position at a steady state scan rate, and by moving the second inductor in a second circumferential direction adjacent to the at least one circular surface to a second inductor end steady state heat treatment position at the steady state scan rate, the second circumferential direction opposite to the first circumferential direction;

directing a first quenchant spray from a first quench apparatus to impinge on a first inductor heated region of the at least one circular surface heated by the first inductor as the first inductor moves in the first circumferential direction to the first inductor end steady state heat treatment position after the first inductor separates from the second inductor by a spray interference distance, and directing a second quenchant spray from a second quench apparatus to impinge on a second inductor heated region of the at least one circular surface heated by the second inductor as the second inductor moves in the second circumferential direction to the second inductor end steady state heat treatment position after the second inductor separates from the first inductor by the spray interference distance;

removing the steady state heat treatment power from the first inductor and terminating the first quenchant spray after the first inductor completes heat treatment at the first inductor end steady state heat treatment position;

moving the second inductor in the second circumferential direction after the second inductor completes heat treatment at the second inductor end steady state heat treatment position to the end of an extended end scan region to heat treat the extended end scan region at an end of heat treatment scan rate faster than the steady state scan rate and at an end of heat treatment power magnitude and frequency;

moving the second inductor in the second circumferential direction after the second inductor completes heat treatment to the end of the extended end scan region to a distance beyond the end of the extended end spray region so that the second quenchant spray impinges on the extended end spray region.

8. The method of claim 7 wherein the step of supplying the oscillatory zone alternating current to the first and second inductors is initiated when the first and second inductors are located side-by-side at the first or second arc boundary.

9. The method of claim 7 wherein the separation of the first and second inductors in the oscillatory arc zone is initiated in the center of the oscillatory arc zone.

10. The method of claim 7 wherein the end of heat treatment frequency is greater than the steady state frequency, and the end of heat treatment power magnitude is greater than the steady state power magnitude.

11. The method of claim 7 wherein the step of supplying the oscillatory zone alternating current further comprises supplying the oscillatory zone alternating current at a pre-heat frequency less than the steady state frequency, and at a pre-heat power magnitude less than the steady state power magnitude.

12. The method of claim 11 wherein the end of heat treatment frequency is greater than the steady state frequency, and at the end of heat treatment power magnitude greater than the steady state power magnitude.

13. A method of electric induction heat treatment of at least one bearing race having an inner diameter of at least one meter, the method comprising the steps of:

positioning side-by-side a first and a second inductor at an initial position adjacent to the at least one bearing race, the initial position located within an oscillatory arc zone of the at least one bearing race, the oscillatory arc zone having a first and a second arc boundary;

supplying an oscillatory zone alternating current to the first and second inductors while circumferentially moving side-by-side the first and second inductors repeatedly between the first and second arc boundaries for a pre-heat period of time while adjacent to the at least one bearing race;

supplying a steady state heat treatment power having a steady state power magnitude and frequency to the first and second inductors while separating the first and the second inductors in the oscillatory arc zone by moving the first inductor in a first circumferential direction adjacent to the at least one bearing race to a first inductor end steady state heat treatment position less than 180 degrees opposite the initial position at a steady state scan rate, and by moving the second inductor in a second circumferential direction adjacent to the at least one bearing race to a second inductor end steady state heat treatment position at the steady state scan rate, the second circumferential direction opposite to the first circumferential direction;

directing a first quenchant spray from a first quench apparatus to impinge on a first inductor heated region of the at least one bearing race heated by the first inductor as the first inductor moves in the first circumferential direction to the first inductor end steady state heat treatment position after the first inductor separates from the second inductor by a spray interference distance, and directing a second quenchant spray from a second quench apparatus to impinge on a second inductor heated region of the at least one bearing race heated by the second inductor as the second inductor moves in the second circumferential direction to the second inductor end steady state heat treatment position after the second inductor separates from the first inductor by the spray interference distance;

removing the steady state heat treatment power from the first inductor and terminating the first quenchant spray after the first inductor completes heat treatment at the first inductor end steady state heat treatment position;

moving the second inductor in the second circumferential direction after the second inductor completes heat treatment at the second inductor end steady state heat treatment position to the end of an extended end scan region to heat treat the extended end scan region at an end of heat treatment scan rate faster than the steady state scan rate and at an end of heat treatment power magnitude and frequency; and directing the second quenchant spray to impinge on an extended quench region by repositioning the second quench apparatus while the second inductor is at the end of the extended end scan region.

14. The method of claim 13 wherein the step of supplying the oscillatory zone alternating current to the first and second inductors is initiated when the first and second inductors are located side-by-side at the first or second arc boundary.

15. The method of claim 13 wherein the separation of the first and second inductors in the oscillatory arc zone occurs in the center of the oscillatory arc zone.

16. The method of claim 13 wherein the end of heat treatment frequency is greater than the steady state frequency, and the end of heat treatment power magnitude is greater than the steady state power magnitude.

17. The method of claim 13 wherein the step of supplying the oscillatory zone alternating current further comprises supplying the oscillatory zone alternating current at a pre-heat frequency less than the steady state frequency, and at a pre-heat power magnitude less than the steady state power magnitude.

18. The method of claim 17 wherein the end of heat treatment frequency is supplied at a frequency greater than the steady state frequency, and the end of heat treatment power magnitude is greater than the steady state power magnitude.

19. A method of electric induction heat treatment of at least one bearing race having an inner diameter of at least one meter, the method comprising the steps of:

positioning side-by-side a first and a second inductor at an initial position adjacent to the at least one bearing race, the initial position located within an oscillatory arc zone of the at least one bearing race, the oscillatory arc zone having a first and a second arc boundary;

supplying an oscillatory zone alternating current to the first and second inductors while circumferentially moving side-by-side the first and second inductors repeatedly between the first and second arc boundaries for a pre-heat period of time while adjacent to the at least one bearing race;

supplying a steady state heat treatment power having a steady state magnitude and frequency to the first and second inductors while separating the first and the second inductors in the oscillatory arc zone by moving the first inductor in a first circumferential direction adjacent to the at least one bearing race to a first inductor end steady state heat treatment position less than 180 degrees opposite the initial position at a steady state scan rate, and by moving the second inductor in a second circumferential direction adjacent to the at least one bearing race to a second inductor end steady state heat treatment position at the steady state scan rate, the second circumferential direction opposite to the first circumferential direction;

directing a first quenchant spray from a first quench apparatus to impinge on a first inductor heated region of the at least one bearing race heated by the first inductor as the first inductor moves in the first circumferential direction to the first inductor end steady state heat treatment position after the first inductor separates from the second inductor by a spray interference distance, and directing a second quenchant spray from a second quench apparatus to impinge on a second inductor heated region of the at least one bearing race heated by the second inductor as the second inductor moves in the second circumferential direction to the second inductor end steady state heat treatment position after the second inductor separates from the first inductor by the spray interference distance;

removing the steady state heat treatment power from the first inductor and terminating the first quenchant spray after the first inductor completes heat treatment at the first inductor end steady state heat treatment position;

moving the second inductor in the second circumferential direction after the second inductor completes heat treatment at the second inductor end steady state heat treatment position to the end of an extended end scan region to heat treat the extended end scan region at an end of heat treatment scan rate faster than the steady state scan rate and at an end of heat treatment power magnitude and frequency; and moving the second inductor in the second circumferential direction after the second inductor completes heat treatment to the end of the extended end scan region to a distance beyond the end of the extended quench region so that the second quenchant spray impinges on an extended end spray region.

20. The method of claim 19 wherein the step of supplying the oscillatory zone alternating current to the first and second inductors is initiated when the first and second inductors are located side-by-side at the first or second arc boundary.

21. The method of claim 19 wherein the separation of the first and second inductors in the oscillatory arc zone occurs in the center of the oscillatory arc zone.

22. The method of claim 19 wherein the end of heat treatment frequency is greater than the steady state heat treatment frequency, and the end of heat treatment power magnitude is greater than the steady state heat treatment power magnitude.

23. The method of claim 19 wherein the step of supplying the oscillatory zone alternating current further comprises supplying the oscillatory zone alternating current at a pre-heat frequency less than the steady state heat treatment frequency, and at a pre-heat power magnitude less than the steady state power magnitude.

24. The method of claim 23 wherein the end of heat treatment frequency is supplied at a frequency is greater than the steady state heat treatment frequency, and at the end of heat treatment power magnitude greater than the steady state heat treatment power magnitude.

* * * * *